United States Patent [19]

Lokhoff et al.

[11] Patent Number: 5,363,250
[45] Date of Patent: Nov. 8, 1994

[54] PRERECORDED RECORD CARRIER

[75] Inventors: Gerardus C. P. Lokhoff, Eindhoven; Johannes J. Roering, Baarn, both of Netherlands

[73] Assignees: U.S. Philips Corporation, New York, N.Y.; Polygram Internat. Holding B.V., Baarn, Netherlands

[21] Appl. No.: 892,100

[22] Filed: Jun. 2, 1992

[30] Foreign Application Priority Data

Jul. 31, 1991 [EP] European Pat. Off. ......... 91201985.8

[51] Int. Cl.$^5$ ................................................ G11B 5/09
[52] U.S. Cl. ............................................ 360/48; 360/49
[58] Field of Search ..................... 360/48, 32, 40, 60, 360/13, 15, 22, 27, 10.1, 25, 31, 74.4, 49; 369/48, 44.12, 54, 58, 112, 270; 358/335, 341, 342

[56] References Cited

U.S. PATENT DOCUMENTS

| | | | |
|---|---|---|---|
| 4,389,681 | 6/1983 | Tanaka et al. | 360/48 X |
| 4,410,917 | 10/1983 | Newdoll et al. | 360/15 |
| 4,496,997 | 1/1985 | Ohtsuki | 360/32 X |
| 4,591,926 | 5/1986 | Gaskell et al. | 360/13 |
| 4,646,170 | 2/1987 | Kobayashi et al. | 360/48 X |
| 4,746,991 | 5/1988 | Efron et al. | 360/31 X |
| 4,899,232 | 2/1990 | Odaka et al. | 360/32 X |
| 5,083,224 | 1/1992 | Hoogendoorn et al. | 360/60 |
| 5,117,313 | 5/1992 | Lockhoff et al. | 360/40 |
| 5,148,330 | 9/1992 | Duurland et al. | 360/40 |

Primary Examiner—Donald Hajec
Assistant Examiner—Patrick Wamsley
Attorney, Agent, or Firm—Edward W. Goodman

[57] ABSTRACT

A prerecorded tape-like magnetic record carrier has, on an A and a B side, a number of adjacent tracks ($T_{a.1}$ to $T_{a.n}$, $T_{b.1}$ to $T_{b.n}$) running in a longitudinal direction on the record carrier, the tracks on the A side, viewed in the play direction of the A side, having a lead-in (LI), an information area (IA) in which music programs are recorded on the A side, and a lead-out (LO), the tracks on the B side, viewed in the play direction of the B side, having a lead-in (LI), an information area (IB) in which music programs are recorded on the B side, and a lead-out (LO). The information areas on the A and B sides include frames ( . . . , $FR_{j-1}$, $FR_j$, $FR_{j+i}$, . . . ) of an essentially fixed length in which digital audio information representing the music programs are recorded. The lead-ins on the A and B sides include frames with lead-in information, these frames having a length essentially equal to the length of the frames in the information areas. The lead-outs on the A and B sides include frames with lead-out information, these frames having a length likewise essentially equal to the length of the frames in the information areas. The end of the information area in a track ($T_{a.i}$) on the A side, viewed in the play direction of the A side, is located past the beginning of the information area in a track ($T_{b.j}$) on the B side, in such a way that X lead-in frames, where for X it holds that $1 \leq X \leq 24$, are located in the section of the lead-in of said track ($T_{b.j}$) on the B side between the end of the information area in the track ($T_{a.i}$) on the A side and the beginning of the information area in the track on the B side.

9 Claims, 4 Drawing Sheets

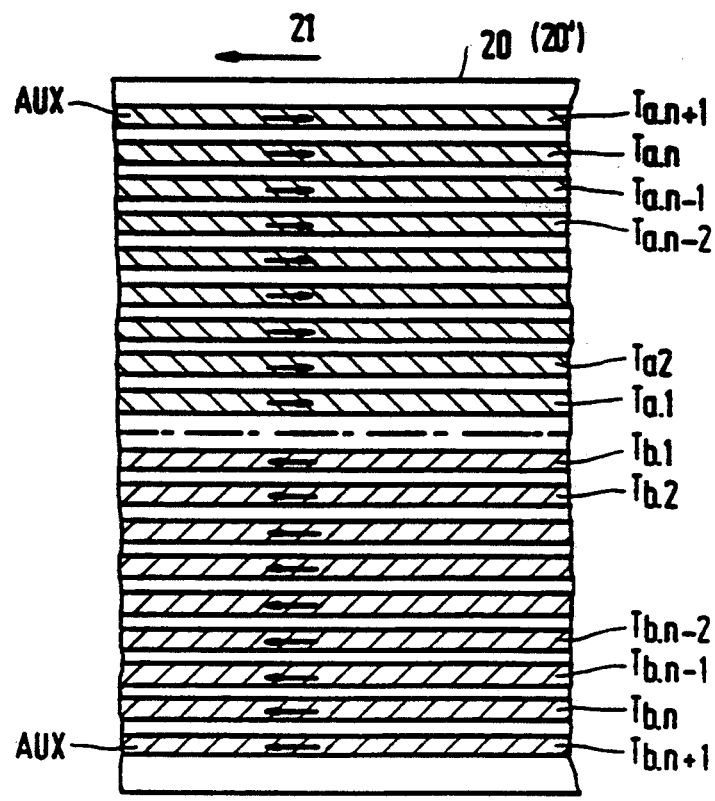

DUPLICATION

LOADING

PRERECORDED RECORD CARRIER

BACKGROUND OF THE INVENTION

1. Field of The Invention

The invention relates to a prerecorded tape-like magnetic record carrier, comprising music programs recorded on an A and a B side, each of the two sides comprising a number of adjacent tracks running in a longitudinal direction on the record carrier, the tracks on the A side, viewed in the play direction of the A side, containing a lead-in, an information area in which the music programs are recorded on the A side, and a lead-out, the tracks on the B side, viewed in the play direction of the B side, containing a lead-in, an information area in which the music programs are recorded on the B side, and a lead-out, the information areas on the A and B sides comprising frames of essentially fixed length in which digital audio information representing the music programs is included, the lead-ins on the A and B sides comprising frames which contain lead-in information, these frames having a length essentially equal to the length of the frames in the information areas, the lead-outs on the A and B sides comprising frames which contain lead-out information, these frames having a length also essentially equal to the length of the frames in the information areas.

2. Description of The Related Art

A record carrier of this type is known in the form of the so-called SDAT cassette. More specifically, reference may be made to Dutch Patent Application No. 90.01.038 (PHN 13,314, date of filing May 1, 1990, corresponding to U.S. Pat. No. 5,148,330, reference (1) in the Reference List. In this patent, a duplicating process is described for obtaining DCC-format prerecorded cassettes. It should be observed in this context that where, in the foregoing and the following, reference is made to music programs recorded on the record carrier, they also comprise pieces of spoken text which may be alternated with the music, for example, in the case where a number of fairy tales are recorded on such a record carrier.

SUMMARY OF THE INVENTION

It is an object of the invention to provide measures for such a prerecorded record carrier, so that an improved use of the prerecorded cassette becomes possible.

The prerecorded record carrier according to the invention is characterized in that the end of the information area in a track on the A side, viewed in the play direction of the A side, is located past the beginning of the information area in a track on the B side, in that in the section of the lead-in of said track on the B side, located between the end of the information area in said track on the A side and the beginning of the information area in the track on the B side, there are X lead-in frames, and in that for X it holds that $1 \leq X \leq 24$.

With prerecorded analog audio cassettes, the position of the end of the audio information on the A side and the beginning of the audio information on the B side, viewed in the longitudinal direction of the record carrier, are taken to be equal. Consequently, an auto-reverse function is possible with such record carriers. The invention is now based on the recognition that when digital audio information is read out, for example, the bit clock in the information read from the B side first needs to be re-captured once the direction of transport has been reversed. For this purpose, it is necessary for the beginning of the audio information in the tracks on the B side not to coincide with the end of the audio information in the tracks on the A side. According to the invention, the beginning of the audio information on the B side, viewed in the play direction of the A side, is now located before the end of the audio information on the A side, so as to make capturing of the bit clock possible. The limits then imposed for X are selected in such a manner that, on the one hand, the capturing may be effected properly, and, on the other hand, the time interval between the instant at which the end on the A side is reached and the instant at which the beginning on the B side is reached is not too large, so that this time interval may be bridged by a signal stored in a signal memory (if available) in the reproducing device and that, furthermore, this signal memory need not be too large.

The prerecorded record carrier may further be characterized in that the difference $(N_A - N_B)$ between the number of frames $N_A$ located in the lead-in and the information area in said track on the A side, and the number of frames $N_B$ located in the information area and the lead-out in said track on the B side is equal to Y, and in that for Y it holds that $1 \leq Y \leq 24$. This makes it possible for a prerecorded cassette, obtained by means of a duplicating process, to be used as a new master cassette.

The prerecorded record carrier may further be characterized in that the number of frames located in the lead-in, the information area and the lead-out in said track on the A side are substantially equal to the number of frames located in the lead-in, the information area and the lead-out in said track on the B side. This measure also makes it highly possible to use a prerecorded cassette as a new master cassette.

Preferably, the frames in the tracks on a side of the record carrier viewed in the longitudinal direction of the record carrier are positioned substantially juxtaposed. This achieves that the reproduction electronics in a reproducing device for reproducing the signals recorded on the record carrier may have a simpler structure. For that matter, juxtaposed frames in the tracks on a side of the record carrier are made available simultaneously during reproduction. Thus, no mutual shift with time of the frames read from the tracks is possible.

BRIEF DESCRIPTION OF THE DRAWINGS

With the above and additional objects and advantages in mind as will hereinafter appear, the invention will be described with reference to the accompanying drawings, in which:

FIGS. 1a and 1b show two prerecorded record carriers;

FIG. 2 shows the format of the tracks on the prerecorded record carrier;

DESCRIPTION OF THE PREFERRED EMBODIMENT

FIGS. 1a and 1b show two exemplary embodiments of prerecorded record carriers 1 and 2, respectively. Each record carrier has the form of a magnetic tape. In the exemplary embodiment shown in FIG. 1a, a leader 11 and a trailer 12 have been provided at the beginning and end, respectively. On the A side of the magnetic tape, viewed in the play direction of the A side (that is, from left to right), there are provided a virginal area V, a lead-in LI, an information area IA, a lead-out LO and a virginal area V, in this order. Likewise, on the B side, viewed in the play direction of the B side (that is, from right to left), there are provided a virginal area V, a lead-in LI, an information area IB, a lead-out LO and a virginal area V, in this order. The information area IA is longer than the information area IB.

In the exemplary embodiment shown in FIG. 1b, the information area IB is longer than the information area IA.

The leader and trailer sections of the magnetic tape may be transparent. The virginal sections V cannot contain information, but it is also possible for data to be recorded in these section, this data not being decodable when the recorded carrier is read out by a reproducing device.

FIG. 2 shows in a diagram the record carriers 1 and 2, respectively, with the tracks provided on the record carrier. On the A side, there are n+1 tracks $T_{a.1}$ to $T_{a.n+1}$ which are parallel with each other and run in a longitudinal direction on the record carrier. The B side likewise has n+1 tracks $T_{b.1}$ to $T_{b.n+1}$. The structure as shown in FIG. 2 stretches out both over the information areas IA and IB and the lead-ins and lead-outs on the A and B sides.

Figure 3:
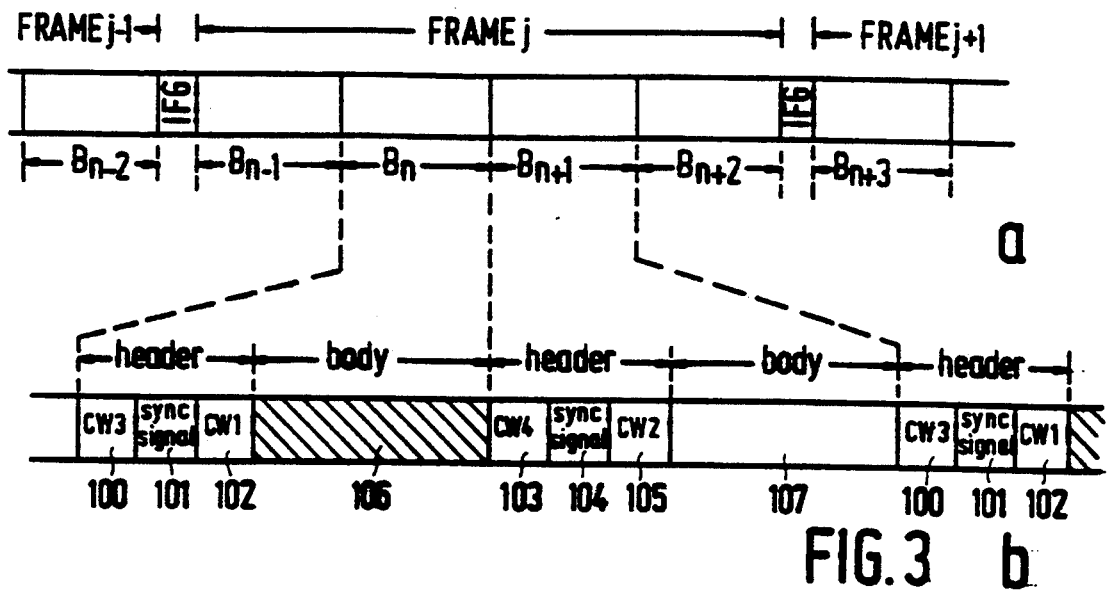
FIG. 3 shows the format of the auxiliary signal in the AUX track on the record carrier.

The tracks $T_{a.n+1}$ and $T_{b.n+1}$ are auxiliary tracks referenced AUX in which an auxiliary signal is recorded, as described in European Patent Application No. 436,991 (PHN 13,209), corresponding to U.S. Pat. No. 5,117,313, reference (3) in the Reference List, and which is considered included in the present Specification where deemed necessary. The auxiliary signal is included in consecutive frames of an essentially fixed length. That is, apart from the variations in the transport speed during recording, the lengths of the consecutive frames are the same. FIG. 3a shows an auxiliary track in which the frames ..., j−1, j, j+1, ..., alternated with interframe gaps IFG are recorded in the track. Each frame comprises a number of consecutive blocks B. In the present example, there are four. Each block B is constituted by a first block section (header) and a second block section (body). The headers contain codewords and a synchronizing (sync) word. The second block sections contain the auxiliary signals. Additional information about the recorded audio information is concerned here. In this connection, one may think of a Table of Contents denoting the initial positions of all the recorded music programs (tracks), the serial numbers (track numbers) of the recorded tracks, the absolute time denoting the time during reproduction elapsed since the beginning of a volume, the relative time denoting the time elapsed since the beginning of the reproduction of a track, the still remaining absolute time and the still remaining relative time. In addition, further marker information may be included in the auxiliary signal. For a further explanation, the reader is referred to U.S. Pat. No. 5,148,330.

It should be noted that in this context, the above description relates to the positions in the AUX track corresponding to positions in the IA and IB areas in the other tracks. In the lead-ins and lead-outs of the AUX tracks on the A and B sides, these lead-ins and lead-outs are also constituted by frames, that is, in similar fashion to that represented in FIG. 3. The encoding in these frames, more specifically, the contents of the bodies in the blocks, is then changed in such a way that the identification of the lead-ins and the lead-outs in the AUX tracks becomes possible.

Digitized and encoded audio information is recorded in the tracks $T_{a.1}$ to $T_{a.n}$ and $_{b.1}$, to $T_{b.n}$, if it is assumed that the magnetic tape section represented in FIG. 2 is located at the position, viewed in the longitudinal direction of the tape, where the information areas IA and IB are available both on the A side and on the B side. The audio information is included in frames in the tracks. These frames are all of substantially the same length, this length being again substantially equal to the length of the frames in the AUX tracks.

FIG. 4a shows a track $T_{a.i}$ and the structure of the frames in this track. The other tracks are structured in similar fashion. The format of the track is extensively described in European Patent Application No. 456,299 (PHN 13,315), corresponding to U.S. Pat. No. 5,243,470, reference (2) in the Reference List, which is considered included in the present Specification where deemed necessary.

The track is constituted by consecutive frames ..., j−1, j, j+1 ..., interrupted by interframe gaps IFG. The interframe gaps are extensively described in European Patent Application No. 448,160 (PHN 13,281), corresponding to U.S. Pat. No. 5,267,098, reference (4) in the Reference List. For a further explanation of these interframe gaps, reference may be had to U.S. Pat. No. 5,267,098. A frame comprises a number of information blocks ..., $S_{m-1}$, $S_m$, $S_{m+1}$, ... In the present example, the frames each comprise 32 information blocks. FIG. 4b shows the contents of a block, such as the block $S_m$. Each block is constituted by a first block section (header) and a second block section (body). The header comprises a sync word 25, a frame number FN, a block number BN and a parity word PAR. The contents of the body are both the digital information representing the recorded audio signal and parity information. For a further explanation, reference may be had to U.S. Pat. No. 5,243,470.

It should further be noted that the physical length of corresponding interframe gaps on a prerecorded record carrier, in the tracks $T_{a.1}$ to $T_{a.n+1}$, these gaps being in the same position viewed in the longitudinal direction of the record carrier, are equally large. Naturally, the same holds for the corresponding interframe gaps in the tracks on the B side. The positions of the interframe gaps on the A side need not correspond to those of the interframe gaps on the B side viewed in the longitudinal direction of the record carrier.

Figure 4:
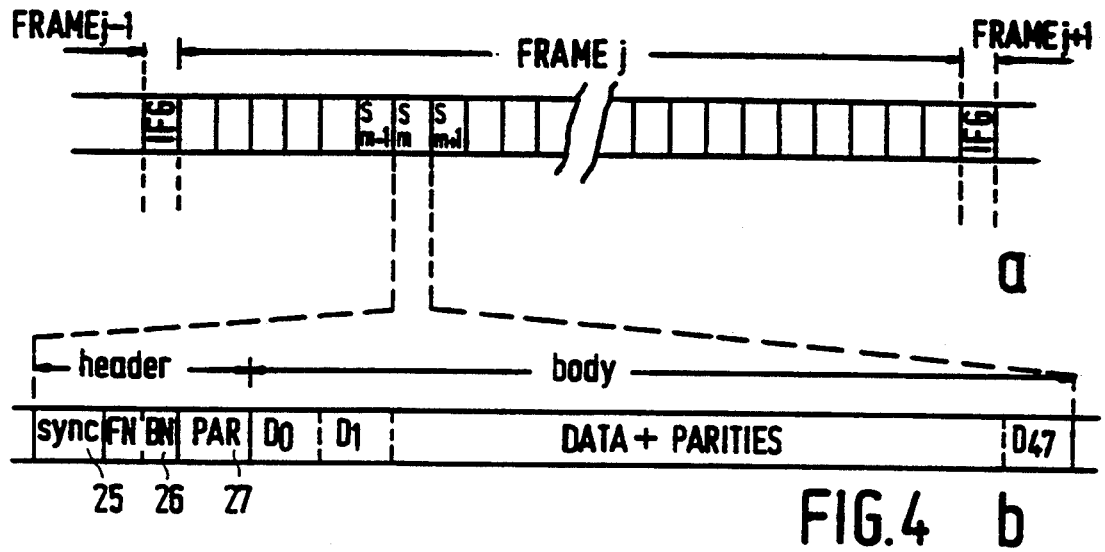
FIG. 4 shows the format of the audio information as recorded in an audio track on the record carrier.

The contents of the lead-ins and the lead-outs in the audio tracks $T_{a.1}$ to $T_{a.n}$ and $T_{b.1}$ to $T_{b.n}$ are as follows. The tracks in the lead-ins and the lead-outs on the A and B sides likewise comprise frames constituted in the manner as represented in FIG. 4. The frames are again alternated with interframe gaps. A difference from the frames in the information areas consists in that no relevant audio information is included in the body of the frames in the lead-ins and lead-outs. For example, these areas could store samples having the value "zero", that is, silence.

FIGS. 1a and 1b show that the end of the information area on the A side, viewed in the play direction of the A side, is located past the beginning of the information area on the B side. This is represented in FIG. 1 by means of the quantity X. For X, the following holds.

Figure 5:
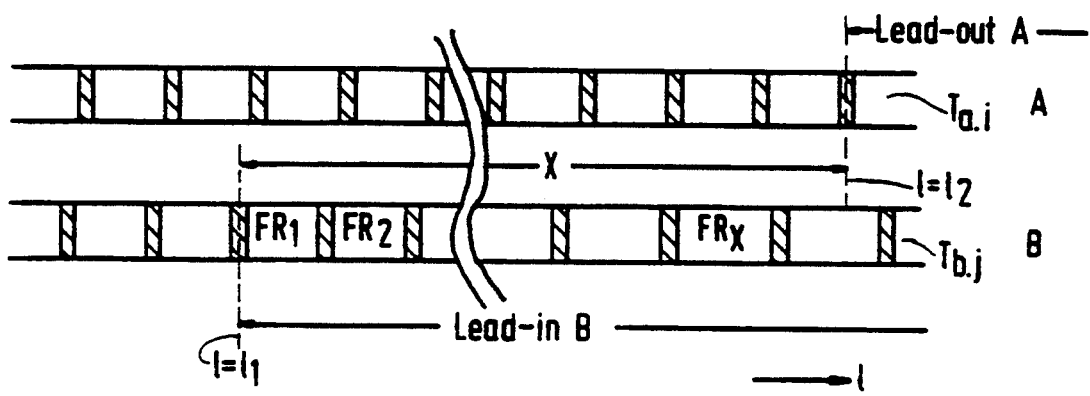
FIG. 5 shows the positions of the beginning of the music information in a track on the B side and the end of the music information in a track on the A side.

For a further explanation, reference is made to FIG. 5. In FIG. 5, two tracks are represented, that is, the track $T_{a,i}$ on the A side, and the track $T_{b,j}$ on the B side. The beginning of the music program on the B side is referenced $l=l_1$ and the end of the music program on the A side by $l=l_2$. X is now meant to be understood as the number of frames located in the part of the lead-in of the track $T_{b,j}$ on the B side between the positions $l=l_1$ and $l=l_2$. These frames are referenced $FR_1$ to $FR_x$ in FIG. 5. For X, it holds that $1 \leq X \leq 24$. More specifically, for example, the following holds for X: $4 \leq X \leq 20$, or $8 \leq X \leq 16$. From FIG. 5, it thus appears that the number of frames exclusive of the interframe gaps between the positions $l_1$ and $l_2$ are concerned. The interframe gaps are hatched in FIG. 5.

Figure 6:
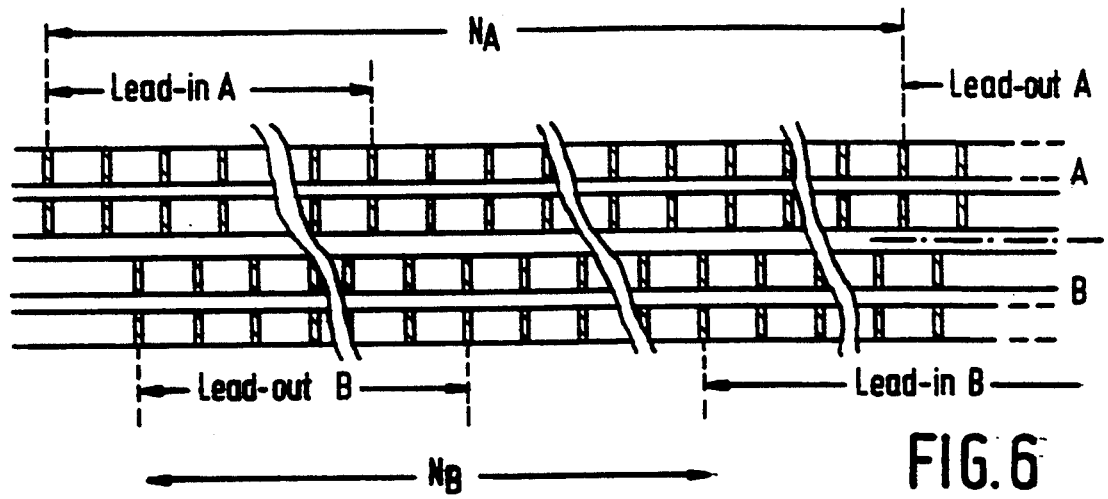
FIG. 6 shows a track on the A and B sides.

The second requirement that may be imposed on the prerecorded record carrier is that the difference in length of the lead-in and the information area on the A side and that of the lead-out and the information area on the B side expressed in numbers of frames is equal to Y, where for Y, it holds that: $1 \leq Y \leq 24$. More specifically, it holds that, for example, $4 \leq Y \leq 20$, or $8 \leq Y \leq 16$. In FIG. 6, this requirement is further clarified. FIG. 6 again represents two tracks, that is, the track $T_{a,i}$ on the A side and the track $T_{b,j}$ on the B side. The number of frames in the lead-in and the information area on the A side are referenced $N_A$. The number of frames in the information area and the lead-out on the B side are referenced $N_B$. Y is now equal to $N_A - N_B$. This means that $N_A$ is always greater than $N_B$. FIG. 6 does show that the beginning of the lead-in on the A side, viewed in the play direction of the A side, is located before the end of the lead-out on the B side. However, this is not a necessity. The reverse may also be the case. However, in both cases, the requirements as to X and Y imposed hereinbefore are to be satisfied.

FIG. 6 further shows how the frames in the tracks on a side such as the A or B side, viewed in the longitudinal direction of the record carrier, are located substantially juxtaposed. For this purpose, FIG. 6 shows, for each side, two of the tracks provided on this side.

U.S. Pat. No. 5,148,330 describes how, in a duplicating step, a prerecorded record carrier, as shown in FIG. 2, can be obtained. It is then possible to copy the A and B sides simultaneously. In that case, use is made of a combined write head with the A side being written in the normal write direction of the A side, and the B side being written simultaneously in a direction opposite to the read direction of the B side.

The beginning of the lead-in on the A side and the end of the lead-out on the B side is, in that case, determined by the relative position of the head-half writing the A side to the head-half writing the B side. FIG. 6 shows that these positions do not exactly coincide.

A third requirement that may be imposed on the prerecorded record carrier is that the total number of frames in the lead-in, the information area and the lead-out in a track on the A side are substantially equal to the number of frames in the lead-in, the information area and the lead-out in a track on the B side. This means that the difference between the two numbers must not exceed 1 frame.

The reason for the former requirement is the desire to make an auto-reverse function possible during reproduction of a prerecorded record carrier. With an auto-reverse function, at the end of the music information on one side of the record carrier, the reproduction of the other side is switched to, so that music is reproduced substantially uninterruptedly. Once the end of the music information on the A side has been detected, the record carrier briefly runs on due to its inertia, and always takes some time to regain the nominal reproduction transport speed once the transport direction has been changed. In addition, the internal clock signal in the digital information that has been read out, must subsequently be re-captured when digital information is being read out. In order to ensure that this re-capturing of the clock signal on the B side is realized before the beginning of the music information on the B side, the position of this beginning needs to be located before the end of the music information on the A side, viewed in the play direction of the A side. The time interval between detection of the end of the music information on the A side and the start of the reading of the music information on the B side may be bridged in the reproduction device by means of a memory in which previously read out music information, having the length of at least the above interval, may be stored.

The reason for the second requirement is that this achieves that a prerecorded record carrier obtained from a duplicating process, as is described in U.S. Pat. No. 5,148,330, can again be used as a new master. The quality of masters, for that matter, may deteriorate after frequent use, so that it becomes necessary for a new master to be produced.

Figure 7A:
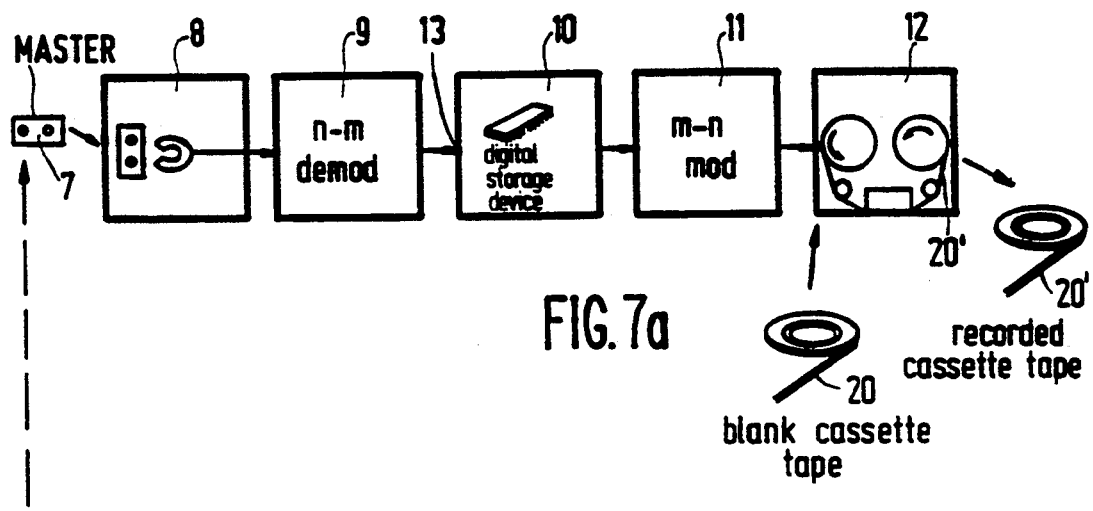
FIG. 7 shows the duplicating process for obtaining the prerecorded cassettes.

Duplication of a master for obtaining prerecorded cassettes is represented in FIG. 7. The following description of the duplication process is a shortened version of the description in U.S. Pat. No. 5,148,330. The master cassette 7 has a similar form to the prerecorded cassette 14. FIG. 7a shows that the master cassette 7, comprising a record carrier such as the record carrier shown in FIGS. 1, 2, 3 and 4, is inserted into a downloader 8. The downloader 8 is a reproducing device by which the information is read from the tracks on the record carrier. The information of both sides is read out simultaneously. This means that the tracks $T_{b,1}$ to $T_{b,n+1}$, are read out in the reverse direction. The information read from the tracks $T_{a,1}$ to $T_{a,n}$ is combined to a serial information stream to be supplied to a signal processor 9. In like manner, the information from the tracks $T_{b,1}$ to $T_{b,n}$ is confined and applied as a serial information stream to the processor 9.

Figure 7B:
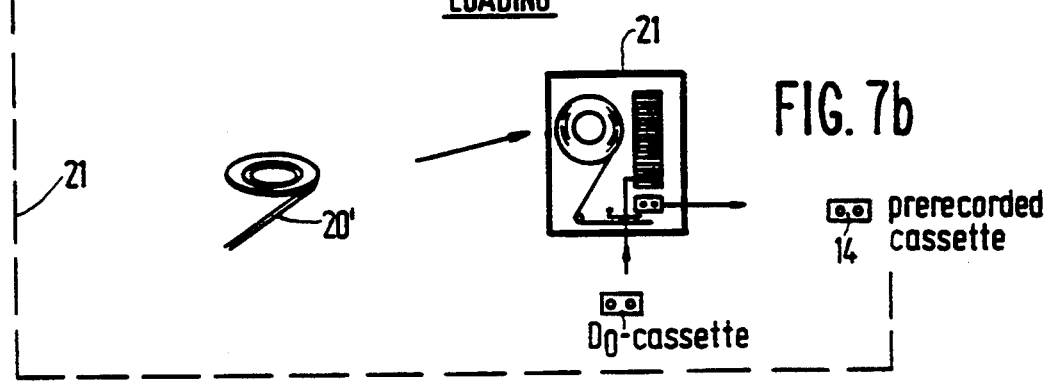

In the processor 9, for example, data reduction takes place after which the signals are stored in a digital storage device 10. Subsequently, the information is repeated and read from the storage device at a higher data rate and applied to a processor 11 in which the signals are processed, in essence, inversely to the processing in the processor 9. The signals processed by the processor 11 are applied to the recording device 12. In this recording device, the signals of the A and B sides are again each distributed over n write heads and simultaneously recorded on the record carrier 20. Blank cassettes are obtained then carrying the slave medium 20'. The contents of one master tape are thus repeatedly recorded on this medium. These blank cassettes may then be used in the existing cassette loading machines for obtaining the prerecorded cassettes 14. This is represented in FIG. 7b.

U.S. Pat. No. 5,148,330 describes that a 10-to-8 conversion may be realized in the processor 9 and that an error correction of the information that has been read out may be performed. Errors that have occurred during the manufacture of the master tape, or the reproduction thereof, may then be corrected. The processor 9 may now comprise a detector which detects how many errors there are in the signal read from the master tape. If this number of errors becomes too great, this means that a situation may occur in which these errors can no longer be corrected. The detector may now produce a warning signal the moment the number of errors exceeds a specific threshold. This threshold is a value denoting a number of errors that can still be corrected by the processor 9. The moment the number of error exceeds the threshold, the master cassette may be replaced by a prerecorded cassette 14 as represented by means of the dotted arrow 21.

Figure 8A:
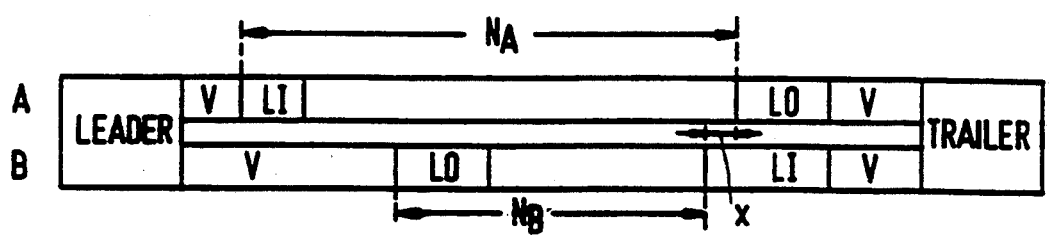
FIGS. 8a–8c show a prerecorded record carrier that does not meet the second requirement imposed.
Figure 8B:
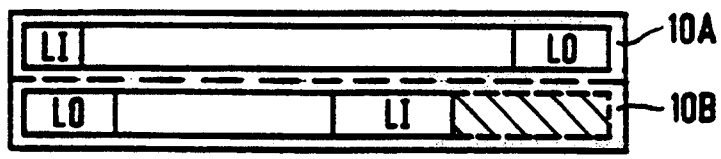

Let us now assume that the second requirement is not met. On could then expect a situation as represented in FIG. 8a. In this case, the difference $N_A - N_B$ does not lie between 1 and 24, or 4 and 20, or between 8 and 16, respectively. If a prerecorded cassette of this type is used as a new master cassette, storing the two audio signals in the digital storage device 10 will lead to a configuration as shown in FIG. 8b. FIG. 8b shows the contents of the storage device 10. When the two sides of the record carrier shown in FIG. 8a are read out simultaneously, the information is not stored in the storage device until the lead-in information is read from side A. Consecutive frames of the A side are thus stored, subsequent to being processed in the processor 9, from a specific first memory location onwards in consecutive memory locations in the section 10A intended for storing the information of the A side. If the end position of the lead-out on the B side is reached, the reading of information from the B side does not begin until then and storing this information in consecutive memory locations in the section 10B, intended for storing the information of the B side, does not begin until then either. Storing the information in the section 10B is also effected from a specific first memory location onwards. Once the information of the two sides has been stored in the storage device 10, part of the storage section 10B will contain no useful information. This part is hatched in FIG. 8b.

Figure 8C:
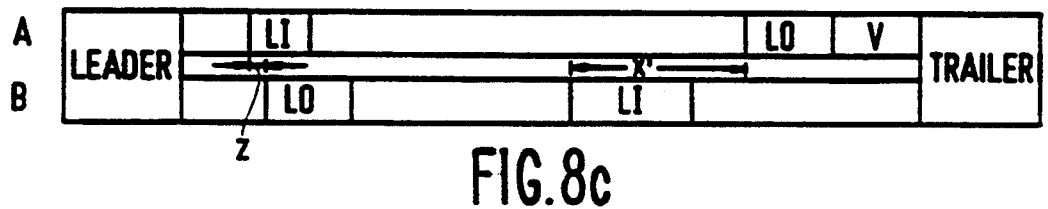

If the contents of this storage device 10 are read out for obtaining prerecorded cassettes, record carriers are obtained as represented in FIG. 8c. Reading out the lead-in information from the A side and the lead-out information from the B side is now effected simultaneously. This means that on the record carrier shown in FIG. 8c, the positions of the beginning of the lead-in on the A side and the end of the lead-out on the B side coincide, apart from the mutual shift z of the two head halves. Compared with the record carrier shown in FIG. 8a, the information on the B side of the record carrier shown in FIG. 8c is moved to the left to such an extent that the quantity X', which again denotes the number of frames between the beginning of the music program on the B side and the end of the music program on the A side, no longer meets the requirement posed first.

If the prerecorded record carrier does meet the second imposed requirement, it becomes possible for a prerecorded cassette obtained during the duplicating step to be used as a new master.

The third imposed requirement has for its object to prevent undefined information from being located in one of the memory sections 10A or 10B as is represented in FIG. 8b for the memory section 10B, which undefined information would otherwise end up on the prerecorded record carriers.

Numerous alterations and modifications of the structure herein disclosed will present themselves to those skilled in the art. However, it is to be understood that the above described embodiment is for purposes of illustration only and not to be construed as a limitation of the invention. All such modifications which do not depart from the spirit of the invention are intended to be included within the scope of the appended claims.

REFERENCE LIST (1) Dutch Patent Application No. 90.01,038 (PHN 13,314) corresponding to U.S. Pat. No. 5,148,330
(2) European Patent Application No. 456,299 (PHN 13,315) corresponding to U.S. Pat. No. 5,243,470
(3) European Patent Application No. 436,991 (PHN 13,209) corresponding to U.S. Pat. No. 5,117,313
(4) European Patent Application No. 448,160 (PHN 13,281) corresponding to U.S. Pat. No. 5,267,098

What is claimed is:

1. Prerecorded tape-like magnetic record carrier, comprising music programs recorded on an A and a B side, each of the two sides comprising a number of adjacent tracks running in a longitudinal direction on the record carrier, the tracks on the A side, viewed in a play direction of the A side, containing a lead-in, an information area in which music programs are recorded on the A side, and a lead-out, the tracks on the B side, viewed in a play direction of the B side, containing a lead-in, an information area in which music programs are recorded on the B side, and a lead-out, the information areas on the A and B sides comprising frames of essentially fixed length in which digital audio information, representing the music programs, is included, the lead-ins on the A and B sides comprising frames which contain lead-in information, these frames having a length essentially equal to the length of the frames in the information areas, the lead-outs on the A and B sides comprising frames which contain lead-out information, these frames having a length also essentially equal to the length of the frames in the information areas, characterized in that the end of the information area in a track on the A side, viewed in the play direction of the A side, is located past the beginning of the information area in a track on the B side, in that in the section of the lead-in of said track on the B side, located between the end of the information area in said track on the A side and the beginning of the information area in the track on the B side, there are X lead-in frames, and in that for X it holds that $1 \leq X \leq 24$.

2. Prerecorded record carrier as claimed in claim 1, characterized in that the difference $(N_A - N_B)$ between the number of frames $N_A$ located in the lead in and the information area in said track on the A side, and the number of frames $N_B$ located in the information area and the lead out in said track on the B side is equal to Y, and in that for Y it holds that $1 \leq Y \leq 24$.

3. Prerecorded record carrier as claimed in claim 1, characterized in that the number of frames located in the lead in, the information area and the lead out in said track on the A side is substantially equal to the number of frames located in the lead in, the information area and the lead out in said track on the B side.

4. Prerecorded record carrier as claimed in claim 3, characterized in that the difference between said numbers is 1 at the maximum.

5. Prerecorded record carrier as claimed in claim 1, characterized in that for X it holds that: $4 \leq X \leq 20$.

6. Prerecorded record carrier as claimed in claim 1, characterized in that for X it holds that: $8 \leq X \leq 16$.

7. Prerecorded record carrier as claimed in claim 1, characterized in that for Y it holds that: $4 \leq Y \leq 20$.

8. Prerecorded record carrier as claimed in claim 1, characterized in that for Y it holds that: $8 \leq Y \leq 16$.

9. Prerecorded record carrier as claimed in claim 1 characterized in that the frames in the tracks on a side of the record carrier, viewed in longitudinal direction of the record carrier, are located substantially juxtaposed.

* * * * *